Figure 1:
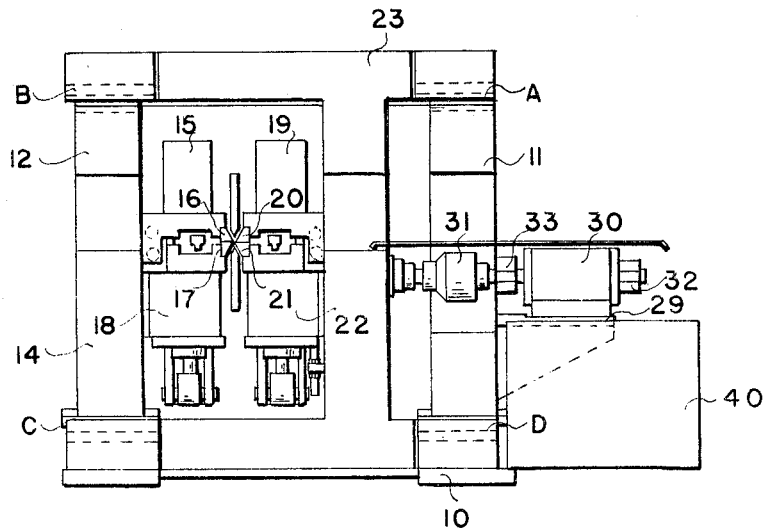

INVENTOR.
MELVIN M. SEELOFF

INVENTOR.
MELVIN M. SEELOFF
BY
Francis J. Klempay
Atty.

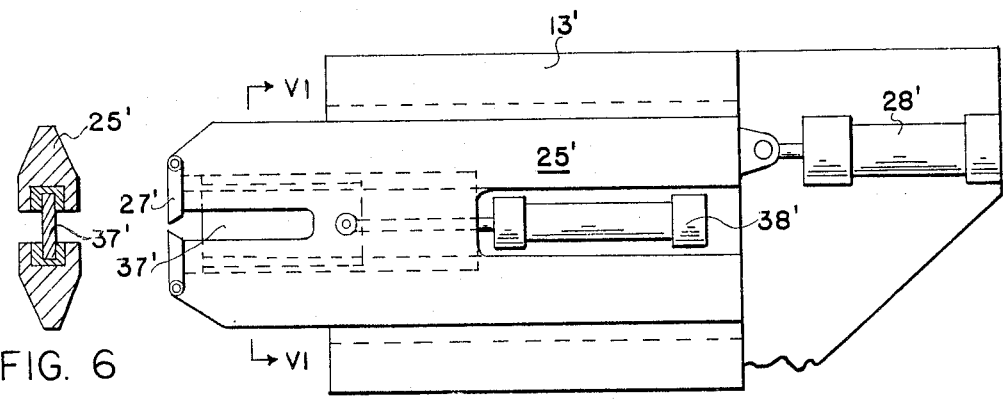
FIG. 6
FIG. 5
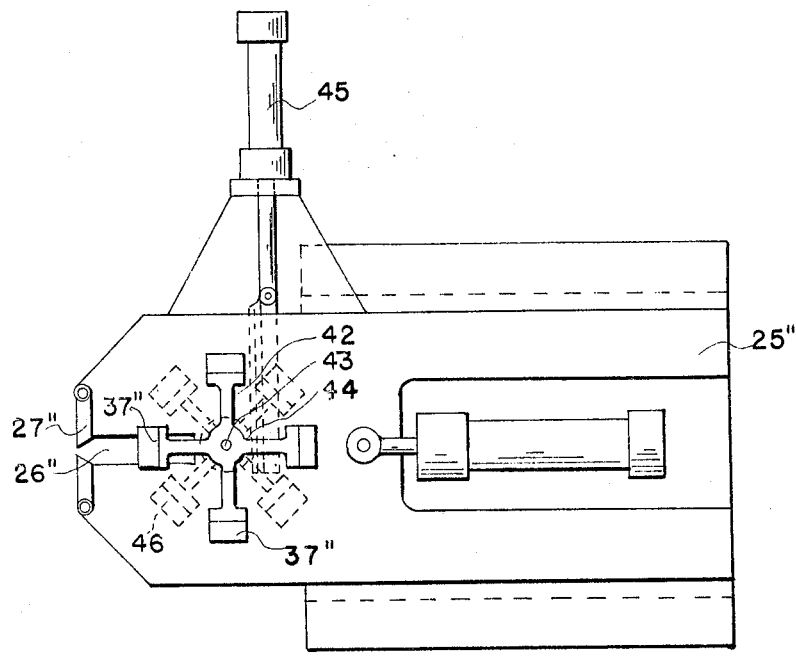
FIG. 7

United States Patent Office 3,278,719
Patented Oct. 11, 1966

3,278,719
FLASH-BUTT WELDING APPARATUS WITH COMBINED STOCK POSITIONING AND FLASH TRIMMING MECHANISM
Melvin M. Seeloff, Warren, Ohio, assignor to The Taylor-Winfield Corporation, Warren, Ohio, a corporation of Ohio
Filed Oct. 24, 1962, Ser. No. 232,835
2 Claims. (Cl. 219—97)

This invention relates to electric resistance flash-butt welding equipment and more particularly to an improved arrangement for incorporating in such equipment means to control the positioning of the workpieces to be welded together and means to remove weld flash and excess upset metal from the weld line. While the principles of the invention are best adapted to apparatus for welding metal strip in end-to-end relation and will be so described herein it should be apparent as the description proceeds that some of the novel aspects of the invention are equally applicable in the flash-butt welding of other metal sections.

It is now common practice in the flash-butt welding art to provide a retractable gauge bar adapted to be positioned between a fixed set of current-conductive clamping dies and a movable set of such dies so that when said sets are in initial predetermined spaced relation workpieces may be moved into said die sets and into abutting relation with opposite surfaces of the gauge bar to thereby predetermine and equalize the extension of the workpieces from said die sets and to likewise predetermine the spacing of the adjacent ends of the workpieces to be welded together. Upon closing or clamping of the die sets and the subsequent retraction of the gauge bar the carrier or platen for the movable die set may be advanced through a predetermined time-position pattern to complete the sequential flashing and upset steps and thus effect the weld between the workpieces. In prior art apparatus of which I am aware it has also been proposed to incorporate a die cleaner with the carrier for the gauge bar so that prior to the final positioning of the gauge bar the die cleaner could be made to clean off any flash metal which may have been previously impinged on the inwardly directed faces of the die sets. However, when welding strip, particularly, it is usually desirable to remove excess flash and upset metal from the work in the region of the weld and heretofore this has been accomplished in apparatus of the kind herein discussed by providing a separate trimming station longitudinally spaced from the welding station and by providing means, in the overall cycle of operation, for longitudinally advancing the joined strip after completion of weld to move the line of weld from the welding station to the trimming station.

The above outlined combination for flash-butt welding, gauging, die cleaning and flash trimming requires combined apparatus of substantial complexity and cost, and it is the primary object of the present invention to materially simplify the mechanical apparatus required to carry out these various functions whereby a practical machine for accomplishing them may be provided at substantially less cost, requiring less space and considerably less cyclic time for effecting a trimmed welded joint between successive workpieces. A further object of the invention is to provide practical and simplified apparatus for effecting both the stock gauging and the flash removing and die cleaning at a single station in the welding machine to thereby avoid the necessity of indexing the work from welding station to trimming station while yet providing for the automatic control of the relative positioning of the two workpieces at the start of a cycle of operation.

Another object of the invention is to provide combined apparatus for effecting the various functions outlined above which may be readily adjusted or interchanged to vary the spacing of the ends of the workpieces to be joined together. Consequently, the projection of the workpieces from the adjacent weld clamping dies is in conformity with optimum practice heretofore determined for stock of varying thicknesses.

The above objects are basically accomplished by my invention by providing, in the welding machine, a retractable slide which carries at the weld line top and bottom cutting tools for removing weld flash and excess upset metal from the top and bottom surfaces of the strip and for simultaneously removing any spatter from the inwardly directed faces of the weld clamping dies and by retractably mounting on this slide gauging means for positioning between the weld clamps to thereby initially control the positioning of the workpieces in the weld clamps. Thus, this slide is made to serve two functions which greatly simplifies the design and operation of the overall equipment.

Yet another object of the invention is the provision of flash-butt welding equipment, particularly for strip, which while having all of the features outlined above is nevertheless so constructed that the welding zone or station is fully exposed to the view of an operator thereby facilitating the visual monitoring of the operation of the equipment.

The above and other objects and advantages of the invention will become apparent upon consideration of the following specification and accompanying drawing wherein there is disclosed certain preferred embodiments of the invention.

Figure 2:
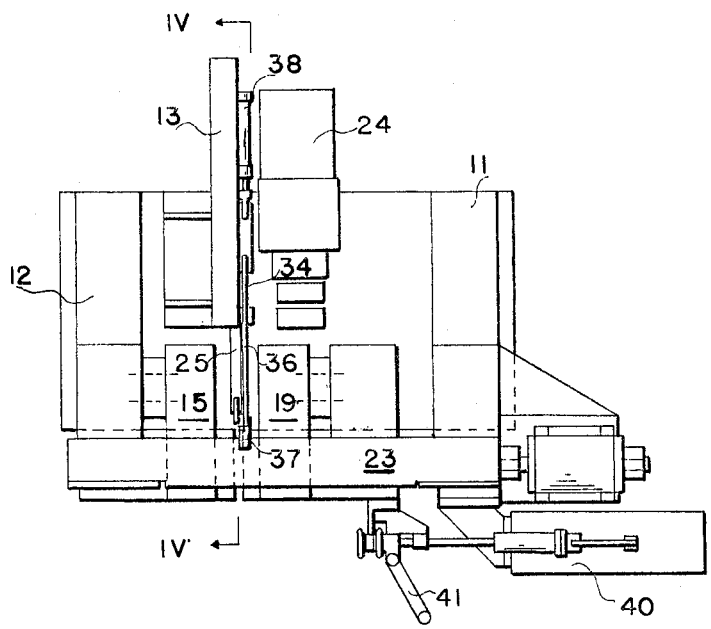
Figure 3:
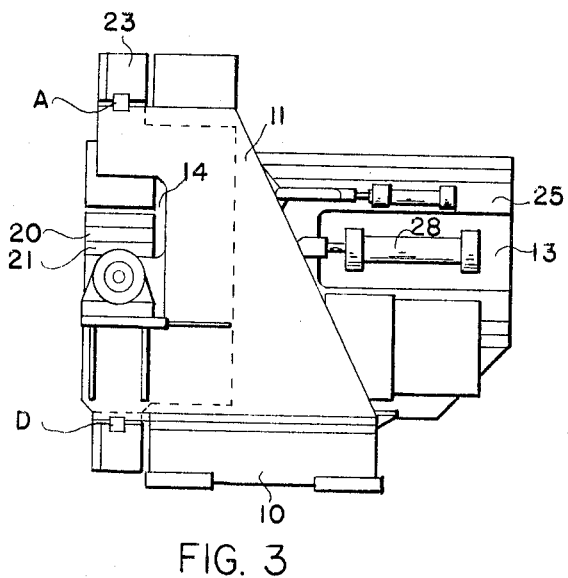
Figure 4:
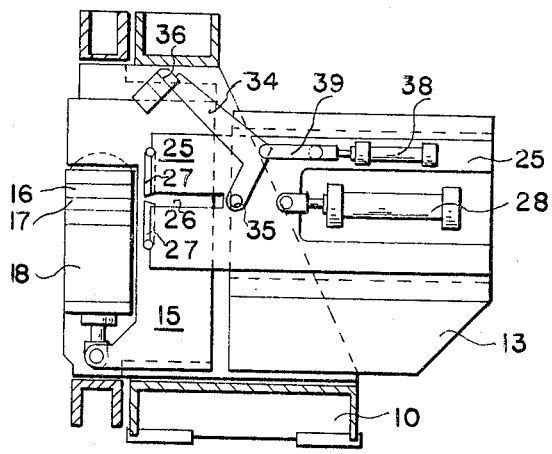

In the drawing:
FIGURE 1 is a side elevation of a flash-butt welding machine constructed in accordance with the principles of my invention;
FIGURE 2 is a plan view of the machine of FIGURE 1;
FIGURE 3 is an end elevation of the machine of FIGURE 1;
FIGURE 4 is a sectional view taken along the line IV—IV of FIGURE 2;
FIGURE 5 is a fragmentary view of a modified form of the combined flash trimmer and gauge bar assembly which may be used in the machine of FIGURE 1;
FIGURE 6 is a sectional view taken along the line VI—VI of FIGURE 5; and
FIGURE 7 is a schematic showing of another possible arrangement for integrating rapidly interchangeable gauge bars with the flash trimming and die cleaning assembly of the welding machine.

In the drawing, reference numeral 10 designates a base on which is rigidly mounted a pair of spaced parallel end housings 11 and 12 and an intermediate parallel vertical support 13. As shown at 14 in FIGURES 1 and 3, the housings 11 and 12 are notched outwardly as viewed in FIGURE 1 to allow longitudinal passage of strip through the machine, the illustrated embodiment of the invention being a strip welding machine.

Rigidly mounted on the housing 12 is a C-shaped frame 15 which mounts in its bight a combined strip clamp and electrode assembly having a fixed upper current-conductive clamp or die 16 and a lower current-conductive die 17 which is suitably guided on the frame 15 and arranged to be raised and lowered by a hydraulic cylinder 18 which is also carried by the frame 15. A similar C-shaped frame 19 mounting similar upper and lower current-conductive clamping dies 20 and 21, respectively, and an actuating cylinder 22 is rigidly carried by an H-shaped slide 23 which is guided for longitudinal sliding movement on the housings 11 and 12 at the four spaced points A, B, C and D. The apparatus thus far described is substantially like that shown in U. S. Patent No. 3,046,385 to which reference is made for a more complete showing of this equipment. Thus, it will be understood that the dies 16, 17 of the fixed clamping platen of the machine will be connected to one secondary terminal of a welding transformer 24 while the other terminal is connected to the dies 21, 20 of the movable clamping platen which is carried by the slide 23. Conveniently, the necessary electrical insulation between the die sets may be effected by the use of insulating wear plates or rails at points A–D as will be understood by those familiar with the electric resistance welding machine art.

Suitably guided in ways formed on the support 13 is a slide 25 which is a vertically disposed plate-like member having a forwardly disposed throat 26. Pivotally mounted on the forward end of the member 25 are upper and lower trimming tools 27 which are operative upon forward movement of the slide 25 to trim the flash from the top and bottom surfaces of the strip joined and to simultaneously clean any flash which may have been lodged against the facing edges of the dies 16, 17, 20 and 21. For this purpose, and in a manner to be hereinafter described, the die sets are precisely spaced from each other at the end of upset in the welding cycle so that the side edges of the tools 27 will have skiving relation to the faces of the dies.

FIGURE 4 illustrates the flash trimmings and die cleaning assembly in retracted position, and cylinder 28 which is carried by the support 13 has its piston rod connected to the slide 25 to move the same in outward and inward directions. It should be understood that in the machine illustrated and immediately upon completion of the welding cycle (i.e. after upset) the cylinder 28 may be actuated to move the trimming tools 27 across the top and bottom surfaces of the welded strip to remove the flash and excess upset metal therefrom and to clean off the faces of the dies as explained above. Upon retraction of the slide 25 the tools 27 swing outwardly about their pivot points to allow for their ready retraction from the work and dies.

Mounted on a suitable support 29 which is rigidly connected with the base 10 is a hydraulic cylinder 30 which is double-acting and which is connected to the slide 23 through an interposed floating hydraulic cylinder 31 which is normally in extended position but which can be readily retracted under suitable control, not shown, to withdraw the movable die set 20, 21 a slight distance to permit the retraction of the gauge bar which will be hereinafter described. As shown, the rod of cylinder 30 is double-ended and adjustably secured on the outer end of this rod is a nut 32 which controls the final die opening at the end of upset to provide the precise spacing between the die sets when the cylinder 31 is extended and at which time the gauge bar now to be described is lowered into position between the die sets to control the extent of projection of the workpieces from their adjacent clamping dies.

Referring now more particularly to FIGURE 4, a bell crank lever 34 is pivotally mounted on the slide 25 as at 35. The free end of lever 34 carries a fitting 36 which mounts a block or bar 37 adapted to be moved downwardly in position between the welding dies upon counterclockwise rotation of the lever 34 as viewed in FIGURE 4. Lever 34 is actuated in both directions by a cylinder 38 which is mounted on the slide 25 and which is connected to the lever through a pivotal link 39.

In actual practice the nosepiece or gauge block 37 is readily removable from and replaceable on the fitting 36 to provide quick changes for various thicknesses of material to be welded. Also, the gauging portion of these blocks may be variably offset with respect to their mounting portions so that whatever thickness of strip is to be welded each workpiece will project outwardly from its associated clamping die the exact same distance. This is important in flash-butt welding procedure to equalize the resistance between the dies and the line of flashing and to also provide equal strength in the projecting ends at upset.

The operating cylinder 30 may be controlled in accordance with any known practice as, for example, wherein a follow valve 40 is under the initial control of a manual operating lever 41 until flashing is well established after which the control proceeds automatically to carry out a desired time-position pattern during flashing at the end of which a dumping valve is actuated to furnish a large volume of high pressure oil to the cylinder 30 to thereby impart a rapid upsetting motion to the slide 22 and consequently to the movable clamping dies 20, 21.

In the embodiment of the invention shown in FIGURE 5 wherein the support 13' corresponds in function to the support 13 above described and wherein the slide 25' corresponds in function to the slide 25 above described, the gauge bar is made in the form of a slide 37' which is suitably guided in ways formed in the slide 25'. Again, the slide 25' carries the pivotally mounted flash trimming and die cleaning tools (27') at its forward end and is provided with a slot or throat to receive the joined strip as these tools move across the same. In this embodiment the gauge bar 37' moves into this throat so that slide 25' must be extended when loading the welder with new strip but otherwise the cycle of operation of the welding machine is the same as outlined above. However, when effecting the flash trimming and die cleaning operation the gauge bar 37 is retracted from the throat in slide 25 by cylinder 38' which again is carried by the slide. Slide 25' is actuated by cylinder 28' and, again, the gauging portion of bar 37' is offset to compensate for the burn off of the workpieces and for any variation which may be desired in the initial projection of the workpieces from their associated clamping dies. Also, the gauge member 37' is readily interchangeable for various thicknesses of stock to be welded as explained above.

In the embodiment of the invention shown in FIGURE 7 a plurality of gauge bars 37" of varying thickness and offset relation are mounted on the spokes 42 of a rotary spider which is journaled for rotation on the trimming tool slide 25" about an axis 43. Again, the slide 25" has a throat 26" and forwardly disposed pivotally mounted flash trimming and die cleaning tools 27". The spider comprised of a hub and the spokes 42 is arranged to be indexed by a rack and pinion assembly 44 operated by a cylinder 45 also mounted on the slide 25", and it should be apparent that any one of the gauge bars 37" may be selectively moved into the longitudinal path through the throat 26" for properly spacing the adjacent end edges of the workpieces to be welded prior to closing of the clamping dies. When a trimming and cleaning cut is to be made by the tools 27" the above mentioned spider is so indexed (into position as shown by dotted lines at 46) that the spokes thereof as well as the gauge blocks 37' are free and clear of the throat 26' to permit the strip stock to enter into the throat. It should be understood that while in a practical machine utilizing the invention of FIGURE 7 both the trimming tolls 27" and the gauge blocks 37" are carried by the single slide 25" the parts will be suitably offset longitudinally of the strip pass to effect an overall mode of operation as outlined above.

Considering further the overall operation of the combined apparatus described above it should be understood that when utilizing the embodiment of FIGURE 4 the slide 25 will be in retracted position when the workpieces are to be loaded in the machine to permit the gauge bar 37 to be inserted between the welding die sets when the movable set or platen is in initial position as determined by the adjustment of the nut 33 and while the cylinder 31 is extended. After the workpieces are abutted against the opposite sides of the gauge bar the weld clamping dies are closed and the cylinder 31 momentarily retracted to permit the gauge bar to be retracted by cylinder 38 without harm to the projecting end portions of the workpieces. Immediately thereafter the cylinder 31 is reextended to reestablish the initial welding die opening, and the machine may now be run through its flashing and upset cycles to complete the weld. The dies 16, 17, 20 and 21 remain clamped onto the work while the tool slide 25 is moved forwardly by cylinder 28 to trim the flash and excess upset from the welded joint and to clean the faces of the dies as above explained. Upon completion of its outward stroke the slide 25 is retracted and simultaneously the clamping dies are released to permit the welded strip to move longitudinally out of the machine.

In the embodiments of the invention shown in FIGURES 5 and 7 the slides 25' and 25'' may remain in forward position during longitudinal running of the welded strip but with the gauge bars 37' and 37'' retracted from the path of the strip as will be understood. As soon as the tail end of the strip passes the welding station it is stopped, the gauge bar moved into operative position and the forward strip is then backed into the gauge bar while the new strip is brought up into abutting relation with the other side of the gauge bar. Upon the workpieces being so properly positioned the clamping dies and retracting cylinder 31 are actuated to permit the tool slide (25' or 25'') to be retracted and conditioned for the next flash trimming and die cleaning cycle.

It should now be apparent that I have provided an improved flash-butt welding machine which accomplishes the objects initially set out above. The utmost mechanical simplicity of the disclosed arrangement for automatically controlling the position of the workpieces in the machine, for trimming flash and excess upset metal from the welded joint, as well as for maintaining the welding die faces in clean and bright condition makes possible a low cost but rugged and dependable machine capable of being rapidly run through its complete operative sequence of functions. Also, by mounting and operating the workpiece positioning or gauging bar on the back side of the machine the weld zone or station remains uncluttered and in full view of the operator. Thus, there is no detraction from the advantageous characteristic of this openness provided by the C-shaped frame arrangement utilized for carrying the weld clamping dies and for countering the clamping forces exerted thereby.

While I have disclosed the various specific arrangements for carrying out the principles of my invention, other detailed arrangements may also be possibly used, and reference should accordingly be had to the appended claims in determining the scope of the invention.

I claim:

1. In an electric resistance flash-butt welding machine having a base, a first forwardly open C-shaped welding clamp rigidly mounted on said base, a first slide movable sidewise on said base and mounting a second forwardly open C-shaped welding clamp, and means on said base to actuate said first slide; the improvement comprising a second slide mounted on said base rearwardly of said clamps and movable in forward and rearward directions, cutting tools mounted on the forward end of said second slide operative to trim weld flash and excess upset metal from welded stock held in said clamps and to clean off the inwardly directed faces of the dies of said clamps, a gauge bar retractably mounted on said second slide and adapted to be moved into position between the dies of said first and second clamps to thereby control the positioning of the inner ends of workpieces poistioned in said clamps preparatory to the effecting of a weld therebetween and the consequent production of said stock, the means mounting said gauge bar on said second slide comprising a bell-crank lever pivotally mounted on said second slide and having a free end portion adapted to project forwardly of said tools when in one rotational position, said gauge bar being interchangeably mounted on the forward end of said portion, and a double-acting cylinder carried by said second slide for rotating said lever.

2. In an electric resistance flash-butt welding machine having a longitudinally extending base and a pair of longitudinally spaced but transversely extending upright supports on said base, a first slide having longitudinally extending top and bottom rails slideably mounted at their ends on said upright supports, said first slide also having a vertically disposed strut interconnecting said rails adjacent one end thereof to form a window between one of said upright supports and said strut, a first forwardly open C-shaped welding clamp mounted on said one of said supports and positioned within said window a second forwardly open C-shaped welding clamp mounted on said strut and also positioned within said window, an upset cylinder mounted on said base adjacent the other of said upright supports and having its cylinder rod bearing against said strut, a third transversely extending and upright support mounted on said base rearwardly of said window and immediate said first mentioned upright supports, a second slide mounted on said third support and bearing a cutting tool movable between said clamps to trim weld flash from metal stock held in said clamps, and a gauge bar retractably mounted on said second slide and adapted to be moved into position between said clamps to thereby control the positioning of the inner ends of workpieces moved into said clamps preparatory to the effecting of a weld therebetween and the consequent production of said stock.

References Cited by the Examiner
UNITED STATES PATENTS

| | | | |
|---|---|---|---|
| 2,121,665 | 6/1938 | Huson | 219—101 |
| 2,203,151 | 6/1940 | Iverson | 219—101 |
| 2,314,656 | 3/1943 | Morton | 29—33 |
| 2,758,184 | 8/1956 | Seeloff et al. | 219—97 |

RICHARD M. WOOD, *Primary Examiner.*